United States Patent [19]
Chrisco

[11] Patent Number: 5,351,035
[45] Date of Patent: Sep. 27, 1994

[54] CLOGGED FILTER INDICATOR
[75] Inventor: Lonnie R. Chrisco, Fresno, Calif.
[73] Assignee: Ben A. Everson, Fresno, Calif.
[21] Appl. No.: 20,995
[22] Filed: Feb. 22, 1993
[51] Int. Cl.5 .............................................. G08B 21/00
[52] U.S. Cl. .................................... 340/607; 340/626; 116/DIG. 25
[58] Field of Search ................ 340/607, 626; 116/268, 116/DIG. 25; 55/274, DIG. 34

[56] References Cited
U.S. PATENT DOCUMENTS

| | | | |
|---|---|---|---|
| 2,821,592 | 1/1958 | Sagar | 340/607 X |
| 2,921,157 | 1/1960 | Stein | 340/607 X |
| 3,201,772 | 8/1965 | Ladusaw | 340/607 |
| 3,312,187 | 4/1967 | McKinlay | 340/607 |
| 3,397,395 | 8/1968 | Pierce | 340/607 |
| 3,505,791 | 7/1968 | Breslin | 340/607 |
| 3,928,006 | 12/1975 | Martineau | 340/607 X |
| 3,934,543 | 1/1976 | Howard | 340/607 |
| 4,033,733 | 7/1977 | Nelson | 340/607 |
| 4,040,042 | 8/1977 | Mayer | 340/607 X |
| 4,162,660 | 7/1979 | Albertson et al. | 116/268 |
| 4,183,029 | 1/1980 | Isayama et al. | 346/140 R |
| 4,233,597 | 11/1980 | Kurz | 340/626 |
| 4,610,703 | 9/1986 | Kowalczyk | 55/274 |
| 4,702,753 | 10/1987 | Kowalczyk | 96/138 |
| 4,751,501 | 6/1988 | Gut | 340/607 |

FOREIGN PATENT DOCUMENTS
1089516 2/1965 United Kingdom .

Primary Examiner—Jeffery A. Hofsass
Attorney, Agent, or Firm—Dennison, Meserole, Pollack & Scheiner

[57] ABSTRACT

A self-contained sensing unit to be mounted on air duct between the filter and blower to monitor the condition of the filter. The sensor has a probe to be inserted into the duct downstream of the filter. The probe is in fluid communication with a bellows. When the filter becomes clogged, a negative pressure in the duct actuates the bellows which in turn closes a circuit from a battery to a signaling device.

5 Claims, 3 Drawing Sheets

CLOGGED FILTER INDICATOR

BACKGROUND OF THE INVENTION

This invention relates to a clogged filter indicator of durable construction, low cost, and of simple installation which can serve as a visual or audible indication when an air filter is clogged. It is well known that a dirty air filter will reduce the efficiency of all air handling systems in which an air filter is employed to remove air borne contaminants. While the clogged filter indicator of this invention has general utility in most air handling systems employing a filter, it has particular utility in residential heating and air conditioning systems, and will be explained in that context.

In these times of concern over energy usage, much publicity has been directed at the public regarding the importance of keeping the air filter clean. A dirty air filter will greatly reduce the efficiency of operation of a heating and air conditioning system thereby increasing the cost of operation and wasting energy.

In the heating mode, a dirty air filter will reduce the air flow to the furnace heat exchanger causing it to operate at a temperature above its normal design range. This reduces the life expectancy of the furnace as well as wasting energy in the increased temperature of the flue gases leaving the furnace. Also, the system balance in the ductwork will be upset reducing the comfort level in the living space.

In the cooling mode, a dirty air filter will reduce the air flow to the evaporator coil thereby unbalancing the heat load between the evaporator and compressor. This can cause the evaporator to ice over further reducing air flow. Also, liquid refrigerant can flood back to the compressor causing damage to the compressor valves and bearings. Service records show that many expensive summertime service calls could have been avoided by the simple expedient of maintaining a clean air filter.

In spite of the wide publicity given to the need to maintain a clean air filter, field service experience indicates that in a majority of the cases, the public fails to properly maintain air filters. Consumer surveys also confirm this by noting that 80% of those surveyed do not periodically check the air filter. Remedial action is taken only after noting a secondary effect such as reduced air flow or high electric and gas bills.

It is clear from the above that a positive reminder in the form of a signaling device is needed to alert the consumer that the filter is dirty. In this manner, an important savings in energy and in reduced service costs can be effected.

A number of clogged filter sensing circuits have been invented as typified by U.S. Pat. No. 4,233,597, issued Nov. 11, 1980, to Gerhard Kurz, and U.S. Pat. No. 4,751,501, issued Jun. 14, 1988, to Edward B. Gut. The patent to Kurz shows a diaphragm responsive to the pressure differential across an air filter. Movement of the diaphragm beyond a predetermined pressure differential actuates a signal lamp. The patent to Gut shows a sensor to measure the pressure differential across a filter. The signal from the pressure differential sensor is combined with a rate of flow signal to actuate an alarm at a predetermined setting.

While the above-mentioned patents do teach dirty filter sensing circuits, the prior art does not teach a filter sensor having the simplicity of construction, the reliability, and the ease of installation found in the instant invention.

SUMMARY OF THE INVENTION

The overall object of the present invention is to provide a dirty filter sensor of reliable design and low cost which will make it attractive for the mass market.

It is another object of the invention to design a self-contained filter condition sensor which can be easily mounted on a furnace or on a duct to sense the condition of the filter.

It is yet another object of the invention to provide the filter condition sensor with a self-contained battery and indicating device.

It is another object of the invention to provide the filter condition sensor with a test switch to determine the condition of the battery and indicating device.

It is a specific object of the invention to make a filter condition sensor of two integrally molded fitted sections. The first section includes a circular well to receive a pressure sensing diaphragm, an extension tube to connect the well with the pressure to be sensed, a plurality of upstanding supports for a microswitch and a battery, and a plurality of tapped circular projections to receive threaded fasteners. The second section is integrally molded and acts as a cover for the first section and supports a signal device and a test switch.

DESCRIPTION OF PREFERRED EMBODIMENTS

Figure 1:
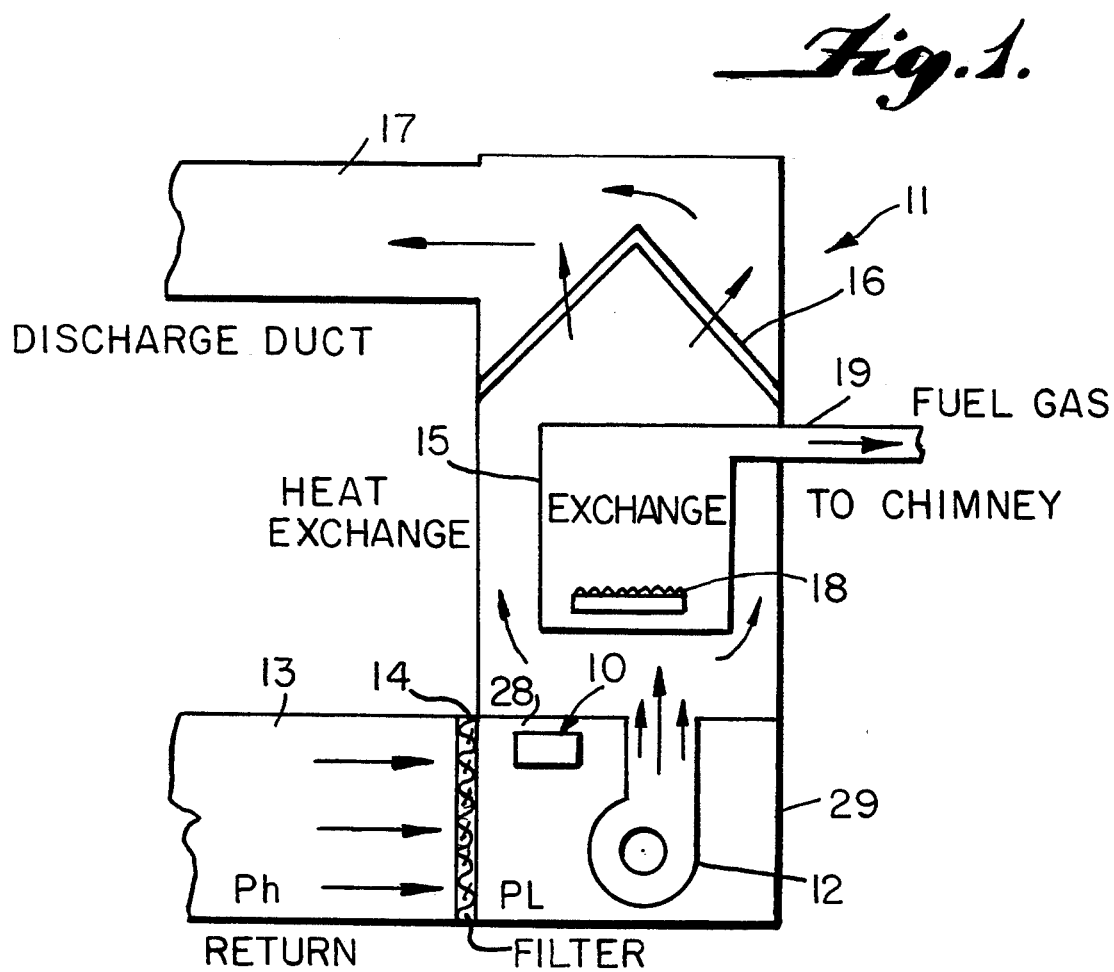
FIG. 1 is a schematic view showing the filter sensor in a typical residential heating and cooling system

Referring now to the figures of drawing, and in particular to FIG. 1, the filter sensor 10 of the invention is shown mounted on a typical residential heating and cooling system 11. The system 11 comprises a blower 12 which draws air in from a return duct 13 through an air filter 14 and discharges it upwardly through a heat exchanger 15 and an air conditioning evaporator 16 into a discharge duct 17. To complete the system, a gas burner or electrical resistance element 18 is provided as a source of heat. If gas is used, a flue gas outlet 19 is provided to carry off the products of combustion.

The discharge duct 17 feeds conditioned air to the various rooms of the residence. Air is returned through a system of smaller return ducts (not shown) which feed into the main return duct 13 to complete the flow path.

The filter 14 serves the important function of removing particulate matter floating in the air, such as dust particles and lint. These particles must be removed to prevent them from collecting on the underside of the evaporator 16 where they can block the air flow. Removal of these particles also aids in reducing the accumulation of dust in the living space.

The filter is located on the intake side of the blower and introduces a slight, but acceptable pressure drop into the system. Thus, as viewed in FIG. 1, the pressure $P_h$ upstream of the filter is higher than the pressure $P_L$ on the other side of the filter. The difference between the pressures $P_h - P_L$ = pressure drop or pressure differential (PD).

The pressure in the intake and discharge ducts generated by the centrifugal blower 12 is quite low and ordinary pressure gauges are not suitable. Duct pressures are measured in inches of water using manometers. Duct pressures at the inlet side of the blower are measured in inches of water vacuum while duct pressures on the discharge side of the blower are measured in inches of water above atmospheric pressure. A clean filter installed in the system of FIG. 1 may generate a normal pressure drop of 0.1 to 0.2 inches of water. A dirty filter may increase the pressure drop to 0.5 inches of water. Although this increase may not seem as much, a pressure drop of 0.5 inches water across the filter will drastically reduce the amount of air supplied the blower.

Although the pressure drop across a filter will vary from one system to another depending upon the rate of flow, duct design, temperature and some other factors, a drop of 0.1 to 0.2 inches water for a new filter in a residential system is reasonable. Referring back to FIG. 1, starting with a new filter, the pressure drop would be about 0.1 inch water. In time, the filter will pick up dust and lint on the upstream side causing an increase in the pressure drop. When the pressure drop reaches 0.4 to 0.5 inches water, system efficiency has deteriorated to the point where the filter should be changed. If left unchanged, the filter will then rapidly load up with dirt causing a serious blockage. Sensor 10 is installed downstream of the filter to sense the occurrence of a harmful pressure drop.

Figure 2:
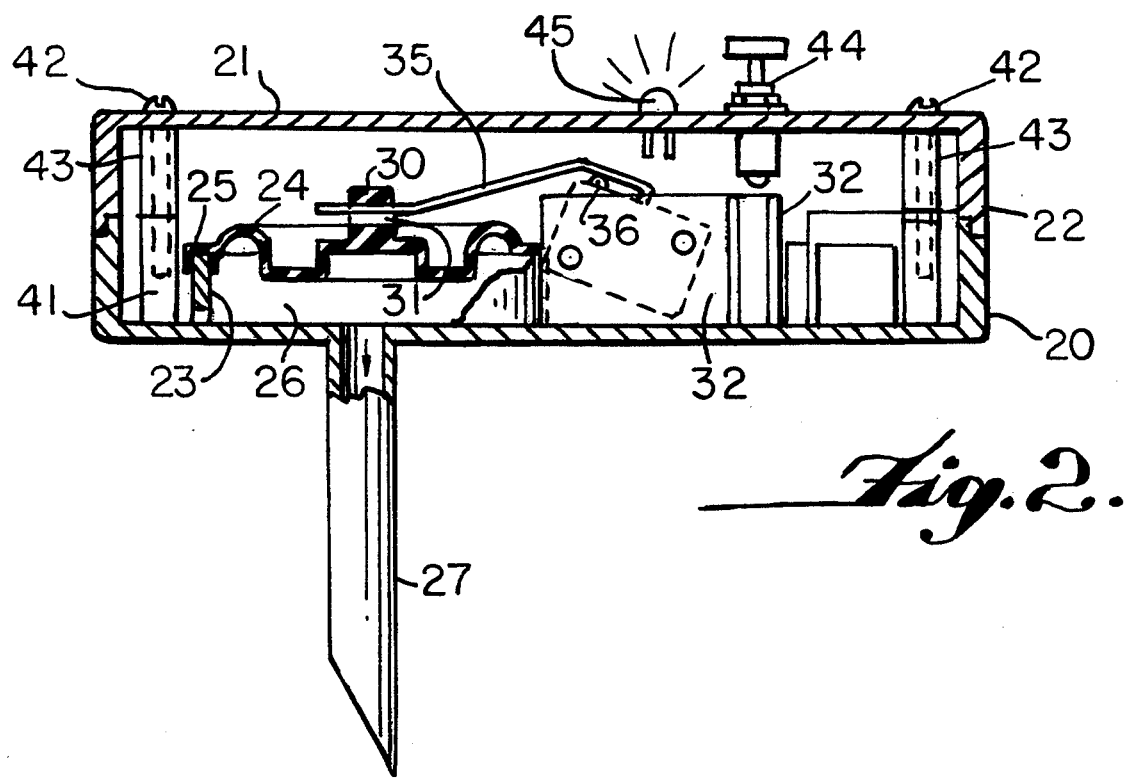
FIG. 2 is a part schematic sectional view of the sensor.
Figure 4:
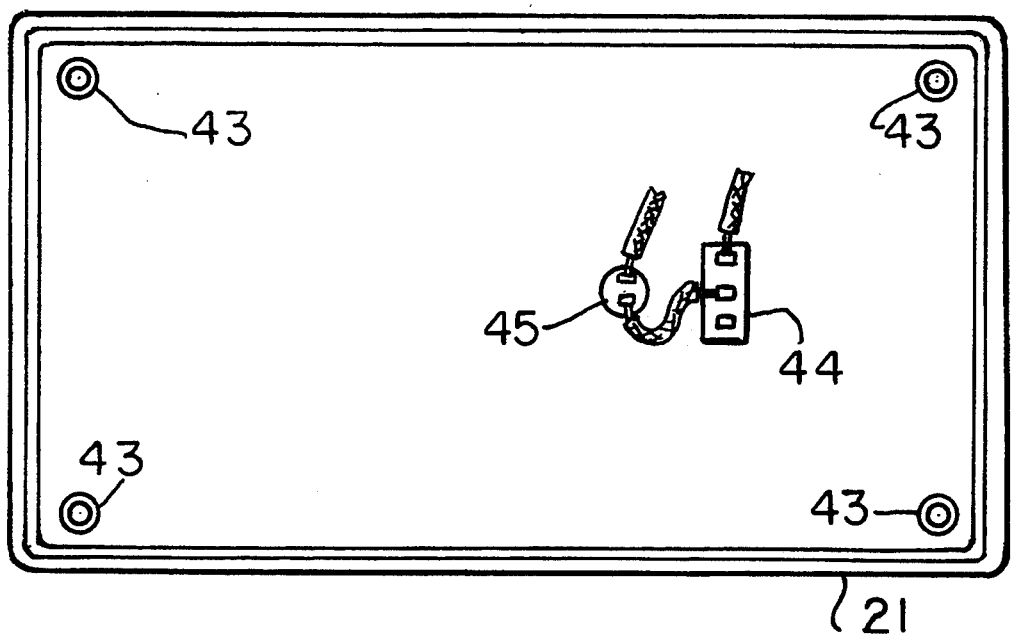
FIG. 4 is a bottom view of the cover with the signaling device and test switch.
Figure 3:
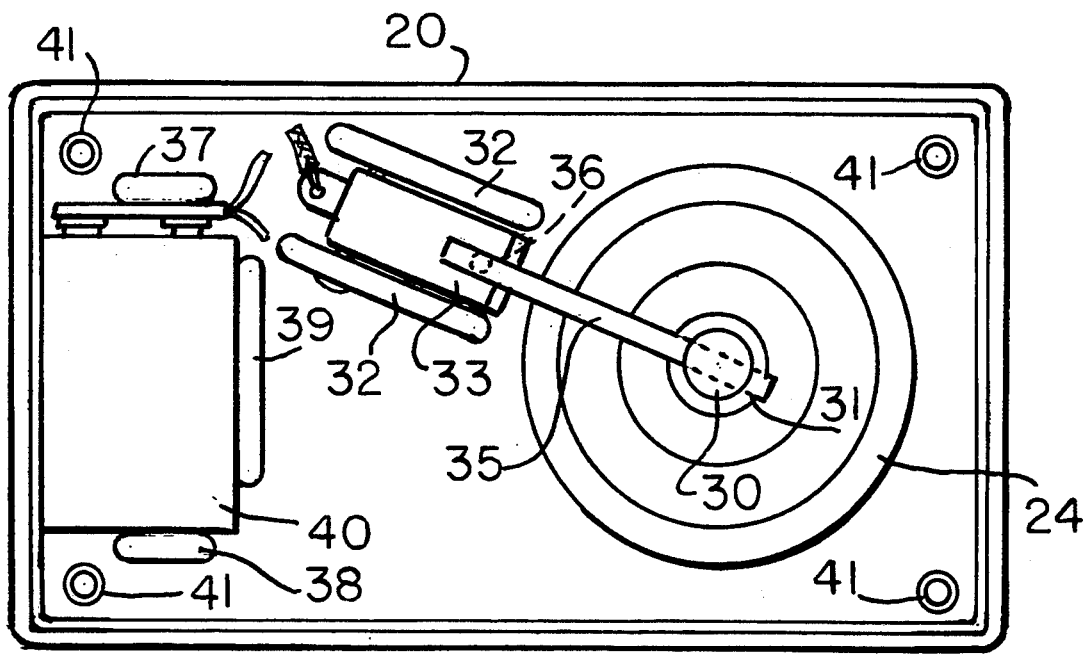
FIG. 3 is a top plan view of the sensor housing showing the location of the parts.

Referring now to FIGS. 2-4, the sensor 10 comprises an integrally molded rectangular housing 20 and integrally molded rectangular cover 21 joined at overlapped peripheral joint 22. The interior of the housing is formed with an integral circular well 23. A plastic bellows 24 is adhesively bonded to a top peripheral portion 25 of well 23 to form an airtight chamber 26. A probe 27 is integrally molded to the housing 20. The probe 27 extends through a hole provided in the wall 28 of the blower housing 29 shown in FIG. 1 for the purpose of conveying the pressure in the blower housing into the chamber 26. The probe is provided with a pointed end to assist in puncturing fiberglass ducts.

While the probe 27 is shown extending into the blower housing when the filter is located in the furnace proper, in those situations where the filter is mounted in a duct remote from the furnace, probe 27 may project into the duct between the filter and blower intake.

A bellows operator 30 is integrally formed with bellows 24 and extends from a central portion thereof. The operator 30 is provided with an opening 31 to receive a switch operating lever to be presently described. A pair of spaced parallel support plates 32 extend from the housing and support a conventional microswitch 33 therebetween by means of fasteners 34. The microswitch is operated by a swinging lever arm 35 pivotally connected at one end to the microswitch to overlie and depress a microswitch operating plunger 36 in conventional fashion. The other free end of lever arm 35 is inserted within the opening 31 in the bellows operator 30. Movement of bellows 24 in response to changes in pressure in chamber 26 operates lever arm 35 to control the microswitch.

Three integrally molded spaced plates 37, 38, 39 extend from the bottom of the housing and enclose a battery 40. Four integrally molded corner posts 41 extend from the bottom of the housing to receive cover fastening screws.

The cover 21 shown in FIG. 4 is of an integrally molded construction and of a shape to enclose the housing 20. Four integrally molded hollow corner posts 43 receive the fastener screws 42 to secure the cover to the housing when the screws 42 are threaded in posts 41. The cover supports a test switch 44 and a signaling device 45 which can be a light source or a buzzer.

Figure 5:
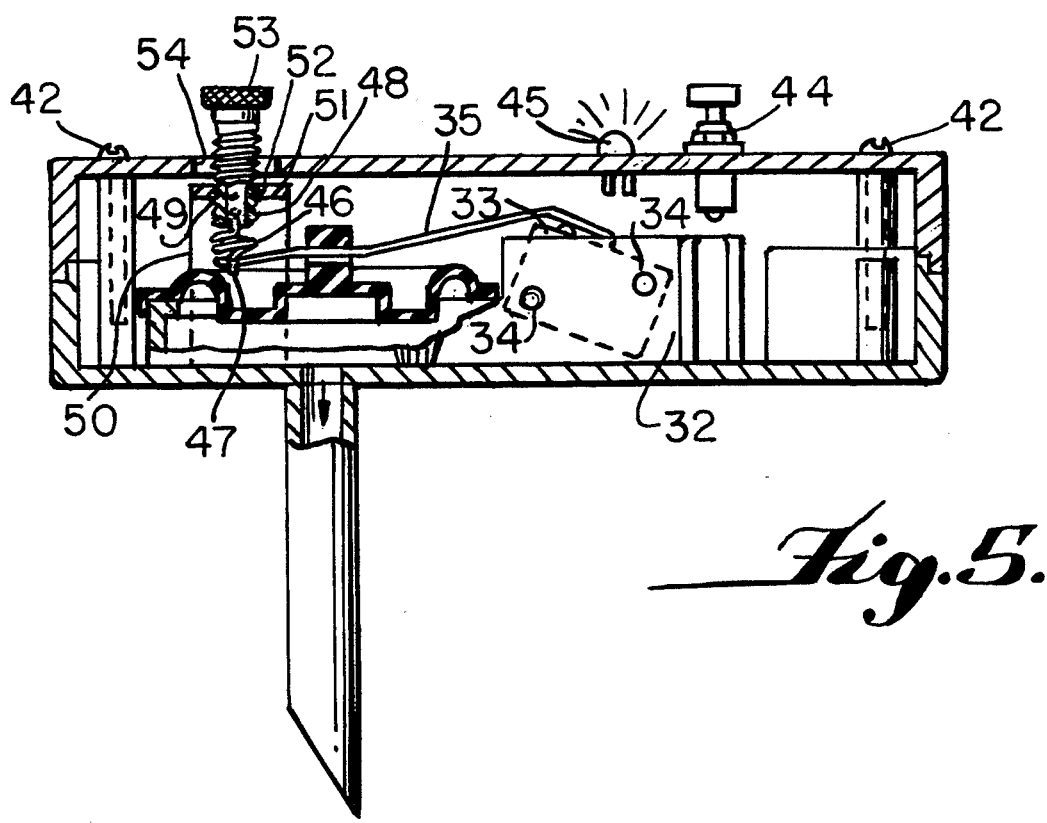
FIG. 5 is a modification employing an adjustment.

FIG. 5 shows a modification of the invention wherein an adjustment is provided to adjust the pressure drop which sets off the alarm. While the basic embodiment of the invention shown in FIG. 1 is designed with components which inherently posses the design constants to function in a typical situation without an adjustable feature, special applications arise where it is desirable to adjust the actuating pressure.

The same reference numerals used in FIG. 2 are used in FIG. 5 to identify the same components. In FIG. 5, a spring 46 is attached to an end portion of lever arm 35 by means of a hook portion 47 threaded into a hole provided the lever arm. The other end of the spring is provided with an enlargement 48 which is captured within a hollow threaded screw 49. An L-shaped support arm has the longer leg 50 secured to the housing 20 and the short leg 51 overlying the spring 46 with a tapped hole 52 for receiving the hollow threaded screw 49. Rotation of screw 49 by disc 53 raises and lowers the screw 49 to adjust the tension of spring A hole 54 in the cover is of a size to enable removal of the cover over the screw 49 and disc 53.

Figure 6:
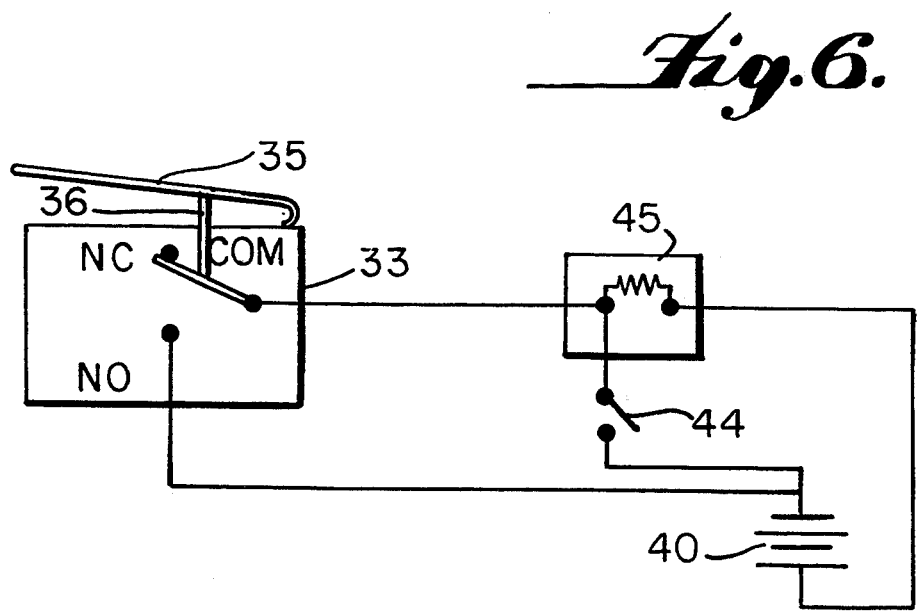
FIG. 6 is a schematic wiring diagram.

The electrical operation of the sensor is explained in connection with the schematic wiring diagram of FIG. 6. A conventional nine volt battery is connected to one terminal of a signaling device 45 which may be an L.E.D. or a buzzer. The other terminal of signaling device 45 is connected to the common terminal of microswitch 33. The normally open terminal (NO) of the microswitch is connected to the other side of the battery. When the plunger 36 of the microswitch 33 is depressed by lever arm 35, a circuit is completed to energize the signaling device. A test switch 44 is wired in parallel with the microswitch and when closed, will energize the signaling device to determine the condition of the battery and the signaling device.

In operation, the sensor is mounted on the intake duct or the air handler housing between the filter and blower intake. If the duct or housing is of metal, a hole is drilled of the size of the probe 27 and the probe is inserted through the hole so as to be responsive to the pressure within the duct or housing. A piece of double-sided adhesive tape may be used to fix the sensor housing to the metal wall. If the duct is of Fiberglass, the probe may be inserted directly into the Fiberglass. A pointed end is provided to puncture the Fiberglass wall.

As the filter accumulates dirt, the pressure will drop between the filter and blower inlet. The pressure drop or vacuum in the duct is conveyed to the bellows by the probe. The presence of a vacuum allows atmospheric pressure acting on the outside of the bellows to push it into the chamber 26. Atmospheric pressure acting on the bellows is sufficiently close to the pressure in the duct upstream of the filter to permit its use without any significant loss in accuracy. At a presettable vacuum keyed to a typical dirty filter, the switch lever 35 will be depressed to operate the microswitch and complete the circuit to the signaling device. This will alert the occupant to the need for a filter change.

In those instances requiring a special vacuum setting, the modification shown in FIG. 5 can be used to achieve any desirable setting.

I claim:

1. In an air handling system wherein an air filter is situated upstream of the intake of an air blower in a duct system, a sensor mounted externally on the duct with a probe extending internally of the duct between the filter and blower to sense the pressure drop caused by dirt accumulating on the filter surface, said sensor comprising a molded plastic container having an external mounting surface and an interior housing portion, an integrally formed circular well in said housing portion, said circular well having a top peripheral portion, a plastic bellows bonded to said top peripheral portion of said circular well, said probe being of rigid construction and bonded to said external mounting surface to project outwardly therefrom into said duct, said probe being in fluid communication with said bellows, an operating arm linked to said bellows and being responsive to movement of said bellows, a switch operated by said arm, a battery mounted within said interior housing, a signaling device mounted on said container, circuitry connecting said battery, said switch and said signaling device whereby a drop in pressure in said duct will be sensed by said bellows to actuate said switch thereby energizing said signaling device, said probe having an end cut at an angle to facilitate penetration of a Fiberglass duct; and including adhesive strips attached to said external mounting surface to adhesively secure said sensor container directly to said duct with the probe extending into said duct.

2. The combination of claim 1 wherein said container includes a separable cover overlying said interior housing portion.

3. The combination of claim 2 wherein said signaling device is mounted on said cover.

4. The combination of claim 3 including a manually operated switch mounted on said cover, said manually operated switch being in series circuit relationship with said battery and signaling device to actuate said signaling device to manually test the integrity of the battery and signaling device.

5. The combination of claim 1 including an adjustment screw mounted on said cover to overlie said operating arm, adjustment of said screw controlling the tension on said arm.

* * * * *